United States Patent
Takahashi et al.

(10) Patent No.: US 8,854,358 B2
(45) Date of Patent: Oct. 7, 2014

(54) COMPUTER-READABLE STORAGE MEDIUM HAVING IMAGE PROCESSING PROGRAM STORED THEREIN, IMAGE PROCESSING APPARATUS, IMAGE PROCESSING METHOD, AND IMAGE PROCESSING SYSTEM

(75) Inventors: Ryutaro Takahashi, Kyoto (JP); Shunsaku Kitamura, Kyoto (JP)

(73) Assignee: Nintendo Co., ltd., Kyoto (JP)

( * ) Notice: Subject to any disclaimer, the term of this patent is extended or adjusted under 35 U.S.C. 154(b) by 237 days.

(21) Appl. No.: 13/404,542

(22) Filed: Feb. 24, 2012

(65) Prior Publication Data

US 2012/0218259 A1  Aug. 30, 2012

(30) Foreign Application Priority Data

Feb. 24, 2011 (JP) ................... 2011-039060

(51) Int. Cl.

| | | |
|---|---|---|
| *G06T 15/00* | (2011.01) | |
| *G06K 9/00* | (2006.01) | |
| *H04N 13/04* | (2006.01) | |
| *H04N 13/02* | (2006.01) | |
| *G06F 3/01* | (2006.01) | |
| *G09G 5/00* | (2006.01) | |

(52) U.S. Cl.
CPC ...... *H04N 13/0452* (2013.01); *A63F 2300/301* (2013.01); *H04N 13/0275* (2013.01); *A63F 2300/204* (2013.01); *G06F 3/01* (2013.01); *G09G 5/003* (2013.01); *A63F 2300/308* (2013.01)
USPC .......................................... 345/419; 382/154

(58) Field of Classification Search
None
See application file for complete search history.

(56) References Cited

U.S. PATENT DOCUMENTS

| | | | |
|---|---|---|---|
| 6,088,006 A * | 7/2000 | Tabata .............................. 345/7 |
| 7,414,792 B2 * | 8/2008 | Domjan et al. ............... 359/630 |
| 2005/0089212 A1 | 4/2005 | Mashitani et al. |
| 2008/0309660 A1 * | 12/2008 | Bertolami et al. ............ 345/419 |
| 2009/0195643 A1 * | 8/2009 | Neuman ......................... 348/51 |
| 2009/0268014 A1 * | 10/2009 | Holliman ........................ 348/46 |
| 2010/0302235 A1 * | 12/2010 | Darshan et al. ............... 345/419 |
| 2011/0090217 A1 | 4/2011 | Mashitani et al. |
| 2011/0102427 A1 | 5/2011 | Mashitani et al. |
| 2011/0102428 A1 | 5/2011 | Mashitani et al. |
| 2011/0103680 A1 | 5/2011 | Mashitani et al. |
| 2011/0157173 A1 | 6/2011 | Mashitani et al. |

(Continued)

FOREIGN PATENT DOCUMENTS

JP 2004/007395 1/2004

*Primary Examiner* — Kee M Tung
*Assistant Examiner* — Nicholas R Wilson
(74) *Attorney, Agent, or Firm* — Nixon & Vanderhye, P.C.

(57) ABSTRACT

Provided are a computer-readable storage medium having stored therein an image processing program executed by a computer of an image processing apparatus capable of outputting an image in a stereoscopically visible manner, the program causing the computer to function as sections configured for: acquiring setting information about a virtual stereo camera configured for imaging of a virtual space to provide images for right and left eyes in a stereoscopically visible manner; designating the position of a first object in the space, including a depth-directional position defining the imaging direction; using the information and the depth-directional position to calculate a displacement for a stereoscopically visible image of the object; and translating from a position, the object associated with the above-designated position, along a plane perpendicular to the depth direction, to generate images for right and left eyes each of which includes an image of the translated object, based on the displacement.

16 Claims, 11 Drawing Sheets

(56) References Cited

U.S. PATENT DOCUMENTS

2011/0157174 A1 6/2011 Mashitani et al.
2011/0157319 A1 6/2011 Mashitani et al.
2011/0193861 A1 8/2011 Mashitani et al.

* cited by examiner

COMPUTER-READABLE STORAGE MEDIUM HAVING IMAGE PROCESSING PROGRAM STORED THEREIN, IMAGE PROCESSING APPARATUS, IMAGE PROCESSING METHOD, AND IMAGE PROCESSING SYSTEM

CROSS REFERENCE TO RELATED APPLICATION

The disclosure of Japanese Patent Application No. 2011-039060, filed on Feb. 24, 2011, is incorporated herein by reference.

FIELD

The exemplary embodiments disclosed herein relate to an image processing program, an image processing apparatus, an image processing method, and an image processing system. More specifically, the exemplary embodiments relate to a computer-readable storage medium having stored therein an image processing program, an image processing apparatus, an image processing method, and an image processing system, for displaying an image in a stereoscopically visible manner.

BACKGROUND AND SUMMARY

Stereoscopic-view techniques are spreading and being applied to movies, games, and the like. In movies, games, or the like, when a 3-dimensional (3D) virtual space is to be stereoscopically displayed, normally, the 3D virtual space is subjected to perspective projection based on a plurality of viewpoints (virtual cameras), whereby an image for right eye and an image for left eye for stereoscopic viewing are generated.

However, in conventional techniques, for example, in the case where a virtual object (e.g., a 2-dimensional image representing an operation button) having a graphical user interface (GUI) function is to be stereoscopically displayed in a 3D virtual space, various problems arise with respect to stereoscopic display of such objects. For example, the following problems arise.

It will be assumed that a GUI object is placed in a 3D virtual space (world coordinate system) and then subjected to perspective projection processing based on a plurality of viewpoints, whereby an image for stereoscopic viewing is generated. In this case, a GUI object positioned far from a viewpoint (virtual camera) is displayed on the display surface of a display device in a smaller manner than the same object positioned near the viewpoint. Therefore, depending on the positional relationship between a viewpoint and a GUI object, the GUI object placed in the space can be eventually displayed at a very small size.

On the other hand, it is preferable that a GUI object is displayed in such a manner (size and position) that allows a user to perform a predetermined operation via the displayed GUI object. In the case where a GUI object is positioned far from a viewpoint as described above, in order to prevent the GUI object from being displayed at a small size on the display surface, it is preferable that the size of the GUI object itself is set to be large. However, in this method, the actual size of the GUI object is different from the size at which the GUI object is displayed on the display surface. Therefore, it is difficult to obtain a desired display of the GUI object.

In addition, even in the case where a GUI object is to be finally stereoscopically displayed to a user with a sense of depth, in creating an application program, the screen design (placement of a GUI image such as an icon on the display surface) may be configured by 2-dimensionally placing a 2-dimensional image on the display surface. However, if the GUI object is subjected to projection processing as described above, a phenomenon occurs in which the GUI object is displayed at a position displaced from the assumed position on the display surface (for example, at a position moved from the assumed position toward the center of the screen).

Because of such a phenomenon, when a GUI object is to be displayed at a designated position on the display surface, it is desired that the manufacturer places the GUI object taking into consideration the manner in which the GUI object is stereoscopically viewed and the position at which the GUI object is displayed on the display surface.

Thus, in the case where a predetermined object is stereoscopically displayed as described above, the position and the size of the object on the display surface vary in accordance with depth information. Therefore, it is difficult to determine the depth position of the object upon stereoscopic viewing while designating the position and the size of the object on the display surface.

Therefore, a feature of the exemplary embodiments provides an image processing apparatus, a computer-readable storage medium having stored therein an image processing program, an image processing method, and an image processing system that are novel and capable of solving such a situation as described above.

In order to achieve the above feature, the exemplary embodiments can be provided in the following aspects, as an example. The following specific description is in all aspects illustrative for the understanding of the extent of the technology disclosed herein, and is not intended to be limited thereto. That is, it should be understood that, from the specific description, a person skilled in the art can implement the technology in the equivalent range based on the description of the technology and on the common technological knowledge.

In one aspect, the exemplary technology disclosed herein provides a computer-readable storage medium having stored therein an image processing program which is executed by a computer of an image processing apparatus capable of outputting an image in a stereoscopically visible manner. The image processing program causes the computer to function as: a virtual stereo camera setting acquiring section, a position designating section, a calculation section, and an image generation section.

The virtual stereo camera setting acquiring section acquires setting information about a virtual stereo camera configured for imaging of a virtual space to provide a first image for right eye and a first image for left eye in a stereoscopically visible manner;

The position designating section designates the position of a first object in the virtual space, including a depth-directional position thereof, which defines the imaging direction of the virtual stereo camera.

The calculation section calculates a displacement for allowing an image of the first object to be stereoscopically viewed, by using the setting information about the virtual stereo camera, and the depth-directional position of the first object.

The image generation section translates from a predetermined position, the first object that is associated with the position designated by the position designating section, along a plane perpendicular to the depth direction, to generate a second image for right eye and a second image for left eye each of which includes an image of the first object translated on the basis on the displacement.

It is noted that a projection plane disclosed herein is a conceptual plane assumed in projection processing, and is an exemplary expression for indicating a condition defining the projection processing. Therefore, the projection plane is not an absolute expression for defining intended projection processing or relevant processing, but may be replaced by another expression for defining another calculation method mathematically equivalent to a calculation for the projection processing, or for defining processing considered to be equivalent to or approximately the same as the projection processing in an information-processing sense. Therefore, it should be understood that the projection surface includes such equivalent things.

In addition, as used here, a "reference plane" refers to a plane for defining the setting about the distance from a virtual camera that causes an object to be appear present on the display surface when stereoscopically viewed.

In one embodiment, the image generation section may acquire the image of the first object by parallel projection, and may translate the acquired image, from a base point which is a position of the image on a projection plane of the parallel projection, along the projection plane.

In one embodiment, the first image for right eye and the first image for left eye may be obtained by performing perspective projection of the virtual space based on the position of a right virtual camera and the position of a left virtual camera composing the virtual stereo camera, respectively.

In various embodiments, the image generation section may project the first object on a projection plane by parallel projection based on a reference virtual camera functioning as a reference for the right virtual camera and the left virtual camera composing the virtual stereo camera; translate the projected image of the first object in a first direction, from a base point which is a position of the projected image on the projection plane, by a distance corresponding to the positional relationship between the right virtual camera and the reference virtual camera, the distance being a part of the displacement, thereby generating the second image for right eye; and translate the projected image of the first object in a second direction, from the base point, by a distance corresponding to the positional relationship between the left virtual camera and the reference virtual camera, the distance being a part of the displacement, thereby generating the second image for left eye.

In one embodiment, the image generation section may project the first object on a projection plane by parallel projection based on the reference virtual camera positioned at the middle point of the virtual stereo camera; translate the projected image of the first object in the first direction, from the base point, by the half of the displacement, thereby generating the second image for right eye; and translate the projected image of the first object in the direction opposite to the first direction, from the base point, by the half of the displacement, thereby generating the second image for left eye.

In another embodiment, the setting information about the virtual stereo camera may include the distance between the right virtual camera and the left virtual camera composing the virtual stereo camera, and the distance between the virtual stereo camera and a reference plane, perpendicular to the depth direction, for providing a stereoscopic view. The calculation section may calculate the displacement by using the distance between the right virtual camera and the left virtual camera.

In one embodiment, the image processing program may further cause the computer to function as a virtual camera interval changing section configured to change the distance between the right virtual camera and the left virtual camera.

The virtual camera setting acquiring section may acquire the setting information about the virtual stereo camera that includes the distance changed by the virtual camera interval changing section.

In one embodiment, the virtual camera interval changing section may change the distance by acquiring an input signal corresponding to an operation of the image processing apparatus performed by a user.

In the above embodiments, the operation by a user may be performed via an input device having a slidable member. The movement amount of the slidable member may be associated with the distance between the right virtual camera and the left virtual camera.

In the above embodiments, a graphics processing unit included in the computer may function as the calculation section.

In the above embodiments, the first object may be defined as a 2-dimensional image that is parallel to a reference plane.

In various embodiments, the image generation section may superimpose an image obtained by translating the image of the first object, on each of the first image for right eye and the first image for left eye, thereby generating the second image for right eye and the second image for left eye.

In various embodiments, the exemplary technology disclosed herein may be provided as a program represented as a code aggregation for providing the function of the image processing program described above.

As used herein, a "code aggregate" refers to an aggregation of command representations or data representations suitable for processing by a calculator (computer). In addition, a "code aggregation for providing a function" refers to as a code aggregation for providing some function to another program. The code aggregate may be provided in an execution form, a source code form, an object code form, or another dedicated form.

In another embodiment, the exemplary technique disclosed herein may be applied as an apparatus, a system, or a method having the function of the image processing program implemented thereon.

As used herein, an "object" or a "virtual object" refers to a subject to be operated or processed in the information processing apparatus, and in some cases, refers to even its behavior. Therefore, a virtual object includes not only a 3-dimensional model defined by an individual coordinate system but also a 2-dimensional image (with which depth information is provided as necessary).

In addition, as used herein, a "computer-readable storage medium" refers to any apparatus or medium capable of storing a program, a code, and/or data to be used in a computer system. The computer-readable storage medium may be any one of a volatile device and a nonvolatile device as long as it can be read by a computer system. Examples of computer-readable storage media include a magnetic tape, a hard disc drive (HDD), a compact disc (CD), a digital versatile disc (DVD), a Blu-ray (registered trademark) disc (BD), a semiconductor memory, but the exemplary embodiments are not limited thereto.

In addition, as used herein, a "system" (for example, a game system, an image processing system, or an information processing system) may include one apparatus, or may include a plurality of apparatuses each of which can communicate with another one of the apparatuses.

As used herein, a state where an apparatus or system is "connected" to another apparatus or system is not limited to a state of being connected by a line, and can include a state of being wirelessly connected.

Provided are an image processing program, an image processing apparatus, an image processing method, and an image processing system that provide novel stereoscopic display with increased convenience.

These and other objects, features, aspects and advantages of the exemplary embodiments disclosed herein will become more apparent from the following detailed description when taken in conjunction with the accompanying drawings.

DETAILED DESCRIPTION OF EXAMPLE EMBODIMENTS

Configuration of Game Apparatus

Figure 1:
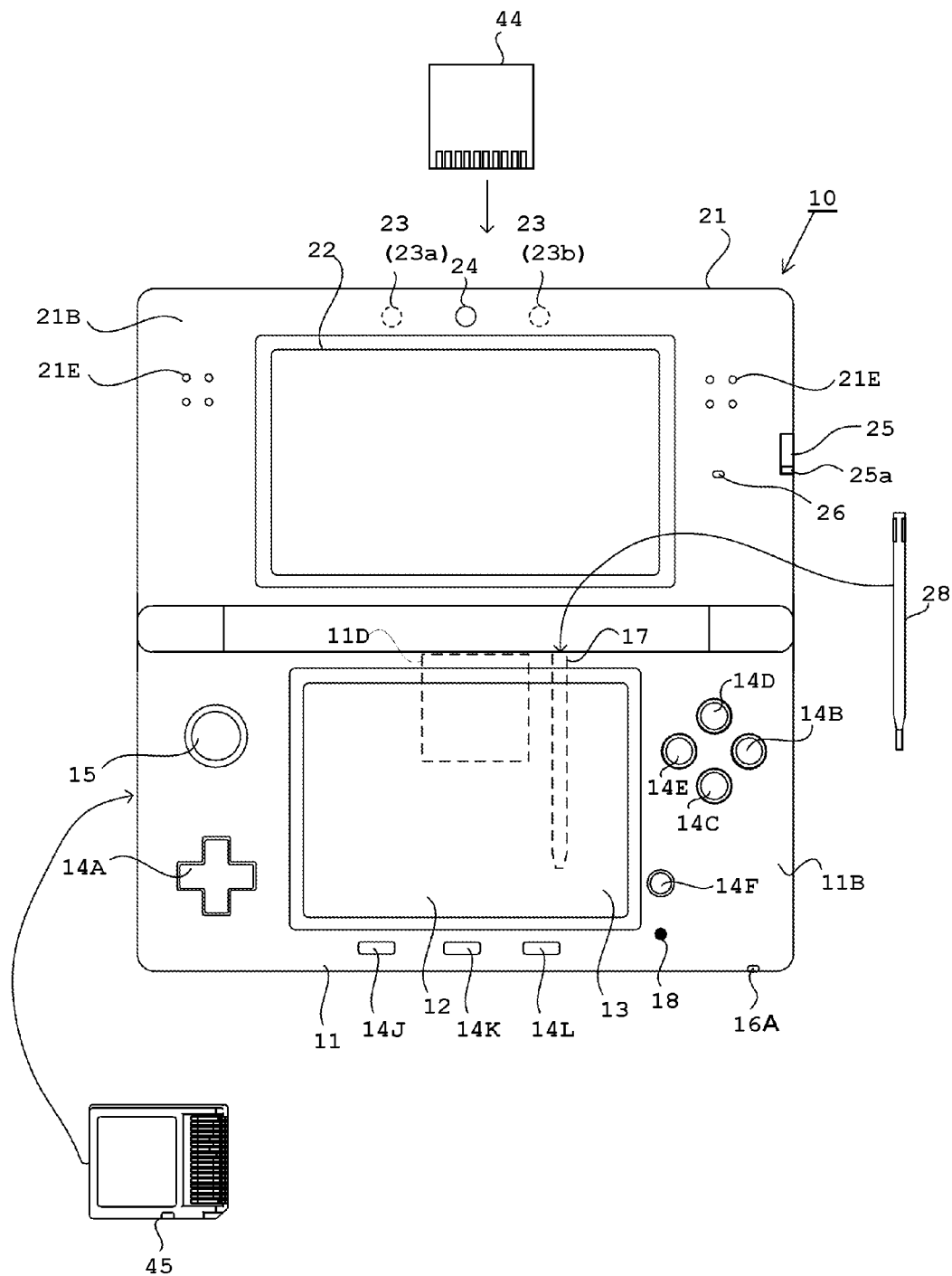
FIG. 1 is a front view showing an example of a game apparatus 10 in an opened state.
Figure 2:
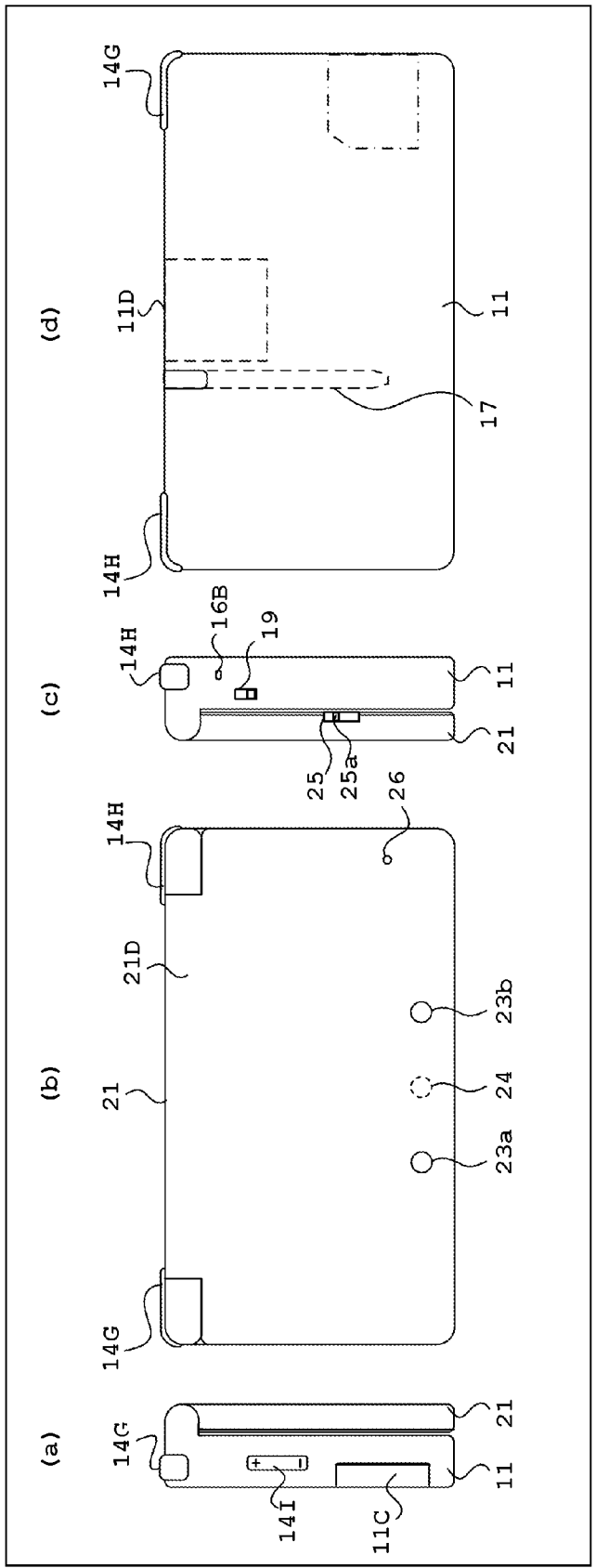
FIG. 2 is a left side view, a front view, a right side view, and a rear view showing an example of the game apparatus 10 in a closed state.

Hereinafter, a game apparatus according to an exemplary embodiment disclosed herein will be described. FIGS. 1 and 2 are each a plan view of an outer appearance of a game apparatus 10. The game apparatus 10 is a hand-held game apparatus, and is configured to be foldable as shown in FIGS. 1 and 2. FIG. 1 shows the game apparatus 10 in an opened state, and FIG. 2 shows the game apparatus 10 in a closed state. FIG. 1 is a front view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

First, an external structure of the game apparatus 10 will be described with reference to FIGS. 1 and 2. The game apparatus 10 includes a lower housing 11 and an upper housing 21 as shown in FIGS. 1 and 2. The lower housing 11 and the upper housing 21 are connected to each other so as to be openable and closable (foldable).

(Description of Lower Housing)

First, a structure of the lower housing 11 will be described. As shown in FIGS. 1 and 2, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIGS. 1 and 2(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined virtual object appears in a three-dimensional virtual space is executed by the game apparatus 10, the analog stick 15 acts as an input device for moving the predetermined virtual object in the three-dimensional virtual space. In this case, the predetermined virtual object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

In addition, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

FIG. 2(a) is a left side view of the game apparatus 10 in the closed state. FIG. 2(b) is a front view of the game apparatus 10 in the closed state. FIG. 2(c) is a right side view of the game apparatus 10 in the closed state. FIG. 2(d) is a rear view of the game apparatus 10 in the closed state. As shown in FIGS. 2(b) and 2(d), an L button 14G and an R button 14H are provided on the upper side surface of the lower housing 11. The L button 14G and the R button 14H act, for example, as shutter buttons (imaging instruction buttons) of the imaging section. Further, as shown in FIG. 2(a), a sound volume button 14I is provided on the left side surface of the lower housing 11. The sound volume button 14I is used for adjusting a sound volume of a speaker of the game apparatus 10.

As shown in FIG. 2(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2(d), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIGS. 1 and 2(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED16B is lit up when the wireless communication is established. The game apparatus 10 has a function of connecting to a wireless LAN in a method based on, for example, IEEE802.11b/g standard. A wireless switch 19 for enabling/disabling the function of the wireless communication is provided on the right side surface of the lower housing 11 (see FIG. 2(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIGS. 1 and 2, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for left eye and an image for right eye are displayed by using substantially the same display area. Specifically, the upper LCD 22 may be a display device using a method in which the image for left eye and the image for right eye are alternately displayed in the horizontal direction in predetermined units (for example, every other line). Alternatively, a display device using a method in which the image for left eye and the image for right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for left eye and the image for right eye, which are alternately displayed in the horizontal direction, to be separately viewed by the left eye and the right eye, respectively.

In the present embodiment, the upper LCD 22 of a parallax barrier type is used. The upper LCD 22 displays, by using the image for right eye and the image for left eye, an image (a stereoscopic image) which is stereoscopically visible with naked eyes. That is, the upper LCD 22 allows a user to view the image for left eye with her/his left eye, and the image for right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described later.

The outer imaging section 23 is a generic term used to include two imaging sections 23a and 23b provided on the outer side surface 21D, which is a surface of the upper housing 21 that is opposite to the main surface having the upper LCD 22 mounted thereon. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. In addition, a manner in which the stereoscopic image is visible is adjusted in accordance with the position of the slider 25a.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopic viewing image is performed in a state where the upper LCD 22 is in the stereoscopic display mode.

Further, a speaker hole 21E is provided on the inner side surface of the upper housing 21. A sound is outputted through the speaker hole 21E from a speaker 43 described later.

(Internal Configuration of Game Apparatus 10)

Figure 3:
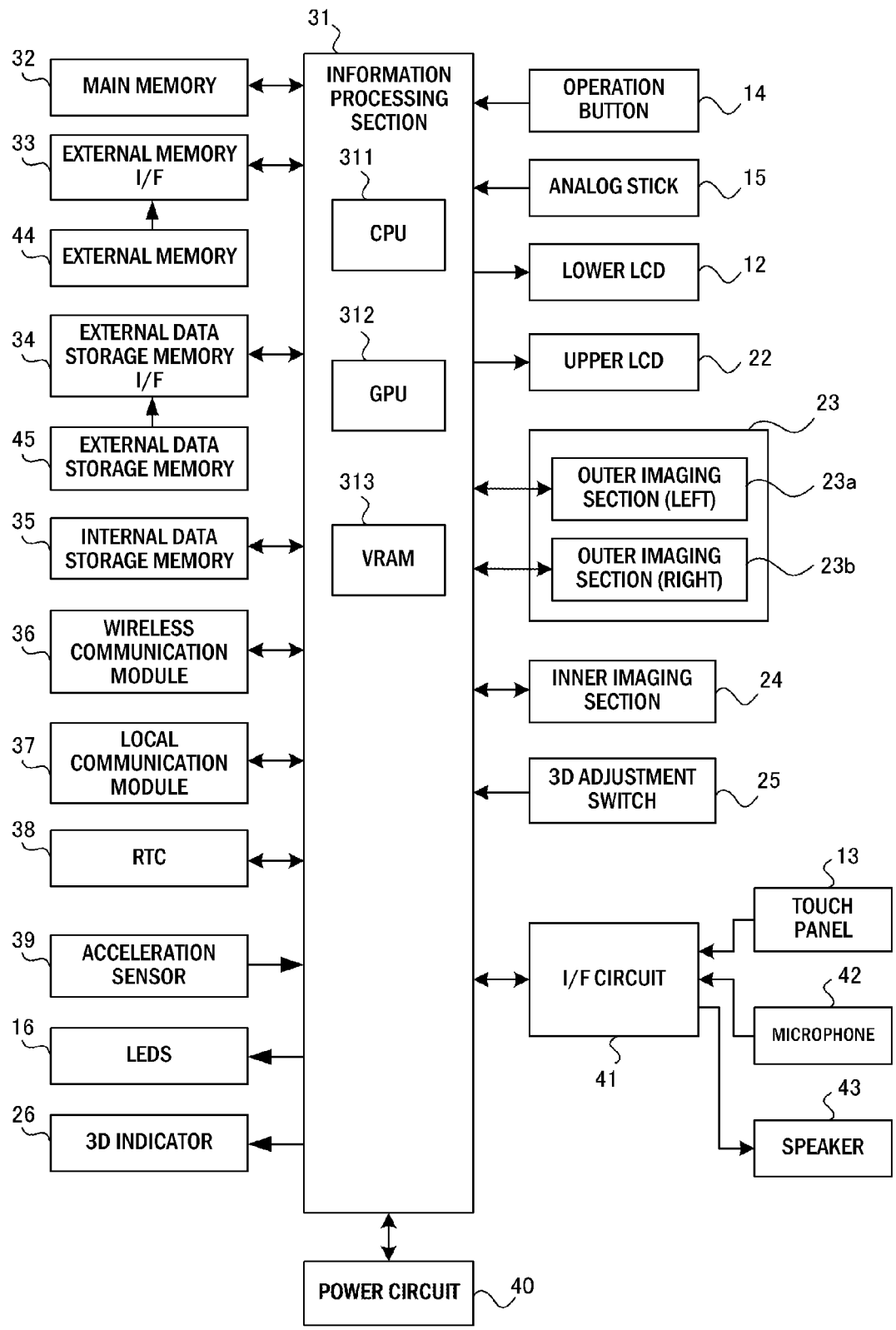
FIG. 3 is a block diagram showing an example of the internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing section which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby executing processing corresponding to the program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

The main memory 32, the external memory I/F 33, the external data storage memory I/F 34, and the internal data storage memory 35 are connected to the information processing section 31. The external memory I/F 33 is an interface for detachably connecting to the external memory 44. The external data storage memory I/F 34 is an interface for detachably connecting to the external data storage memory 45.

The main memory 32 is volatile storage used as a work area and a buffer area for (the CPU 311 of) the information processing section 31. That is, the main memory 32 temporarily stores various types of data used for the processing based on the above program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication based on a unique protocol, or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three orthogonal axial directions, respectively. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform processing in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for right eye and an image for left eye which are stored in the VRAM 313 of the information processing section 31 are outputted to the upper LCD 22.

More specifically, the LCD controller alternately repeats reading of pixel data of the image for right eye for one line in the vertical direction, and reading of pixel data of the image for left eye for one line in the vertical direction, thereby reading, from the VRAM 313, the image for right eye and the image for left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. Description thus far is for the internal configuration of the game apparatus 10.

(Exemplary Embodiment of Image Processing Apparatus)
(Summary of Processing for Providing Stereoscopic View)

Next, the summary of processing based on an image processing program 70, executed by the game apparatus 10 which is the image processing apparatus of the exemplary embodiment, will be described. In the exemplary embodiment, the information processing section 31 executes processes described below (particularly, all steps in later-described flowcharts in FIG. 6A and subsequent drawings). However, instead of the information processing section 31, a processor or a dedicated circuit may execute any step of the processes.

In the present embodiment, the exemplary technology disclosed herein provides the game apparatus 10 as an example of an image processing apparatus capable of outputting a virtual space in a stereoscopically visible manner. The game apparatus 10 achieves the exemplary image processing by executing the image processing program 70 (see the description of a "memory map" described later, and FIG. 5). The image processing program 70 is called during execution of game processing based on a game program 71 as an application program, or executed as a program for realizing a part of the function of the game program 71, whereby the image processing of the exemplary embodiment is achieved. It is noted that how the function is divided between the image processing program 70 and the game program 71 may be arbitrarily changed.

While executing the game processing, the game apparatus 10 provides images obtained by rendering a series of virtual spaces, on the display surface (for example, the upper LCD 22), in a stereoscopically visible manner. Hereinafter, an example of a process in which the game apparatus 10 renders and displays an image of a virtual space will be described with reference to FIG. 4A and subsequent drawings.

The application program defines processing of representing a 3-dimensional scene defined by a world coordinate system (i.e., an orthogonal coordinate system that is used for inputting and outputting graphics and does not depend on the apparatus), as a 2-dimensional scene, on the display surface of the display device. That is, an object placed in a world coordinate system is subjected to one or more coordinate transform(s) to a space, i.e., a coordinate system, as necessary. In addition, based on the game program 71, an image such as a GUI icon (for example, a 2-dimensional image of an object OBJ1 exemplified in FIG. 4A described later) can be displayed on the display surface (for example, the upper LCD 22) of the game apparatus 10. Here, it is preferable that such an icon is displayed so as to maintain a desired position and a desired size on the display surface, so that a user can visually recognize the icon and perform a predetermined operation for the icon. In addition to this, in some cases, it is desired that such an icon is provided in a stereoscopically visible manner.

The game apparatus 10 according to the exemplary embodiment takes an image of a virtual space with a virtual stereo camera from a desired viewpoint in accordance with the progression of the application program, thereby providing the image on the display surface in a stereoscopically visible manner. Moreover, while displaying such an image taken with a virtual stereo camera on the display surface in a stereoscopically visible manner, the game apparatus 10 also displays a GUI image as necessary in a stereoscopically visible manner so as to satisfy various requirements as GUI.

First, processing based on an application program for displaying a 3-dimensional scene defined in a world coordinate system as a 2-dimensional scene on the display surface (for example, the upper LCD 22), and general processing of providing the 2-dimensional scene in a stereoscopically visible manner, will be described. Thereafter, particular processing relevant to an GUI object will be described.

In the information processing by the game apparatus 10, a predetermined object is placed in a world coordinate system in accordance with a request from the application program (for example, the game program 71). If the predetermined object is, for example, a 3-dimensional virtual object, the 3-dimensional virtual object is represented by a model defined in a local coordinate system, and is placed in the world coordinate system, based on the model.

Only a partial space of a virtual space taken from a viewpoint of an observer (virtual camera) is finally displayed on the display surface (for example, the upper LDC 22) of the display device of the game apparatus 10. The virtual camera has a position and a direction in the world coordinate system. The position and the direction are used for setting the virtual camera at the position and in the direction. The virtual camera and all models are subjected to view coordinate transform. The view coordinate transform is transform from the world coordinate system to a predetermined coordinate system in which the virtual camera is positioned at the origin. The space after the transform is referred to as a camera space (camera coordinate system).

In the view coordinate transform, the virtual camera is directed in the positive direction of the z-axis such that the upper direction of the virtual camera corresponds to the y-axis and the left direction of the virtual camera corresponds to the x-axis, for example. The manner of directing the virtual camera with respect to the three axes may slightly differ depending on the specification of each application program. For example, the virtual camera may be positioned at the origin, and directed in the negative direction of the z-axis such that the upper direction of the virtual camera corresponds to the y-axis and the right direction of the virtual camera corresponds to the x-axis.

Next, so-called vertex shading processing may be performed as necessary. Thereafter, the information processing section 31 of the game apparatus 10 performs projection processing (transforms a view volume to a unit cube (canonical view volume)). Normally, perspective projection is used for the projection processing so as to realize the manner (perspective) of visual recognition of an object in a real space.

In perspective projection, the farther from a viewpoint (virtual camera) an object is, the smaller the object is processed to appear after the projection. Geometrically, the view volume in the perspective projection is a frustum.

Figure 4A:
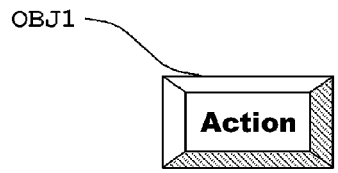
FIG. 4A is a schematic diagram showing an example of a GUI virtual object provided as a 2-dimensional image.
Figure 4B:
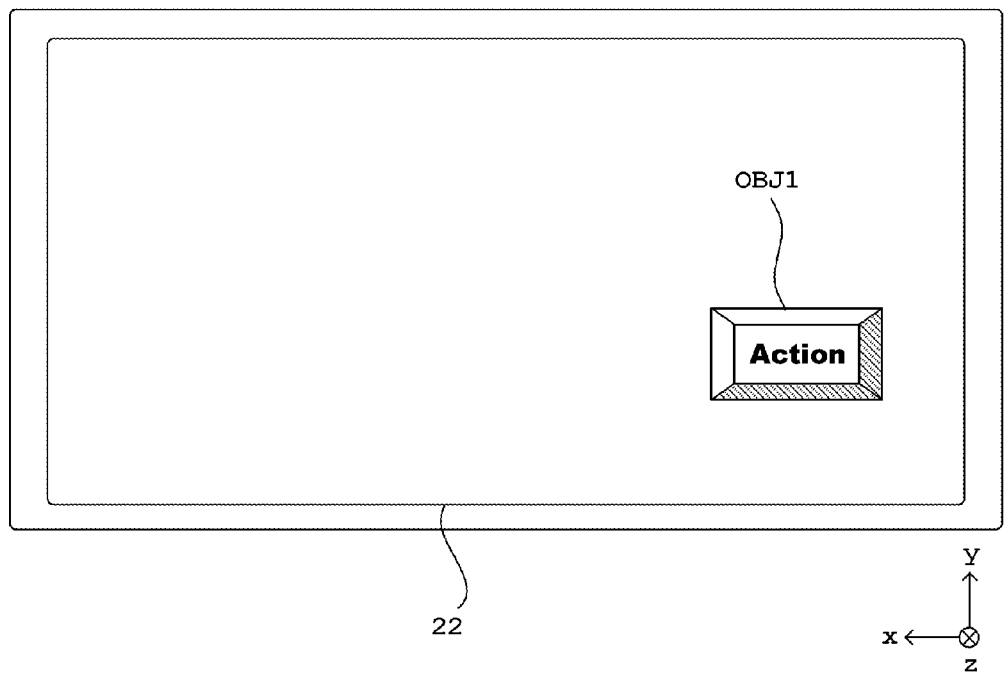
FIG. 4B is a schematic diagram showing an exemplified position of an object OBJ1 displayed on an upper LCD 22 when a parallax barrier is disabled.
Figure 4C:
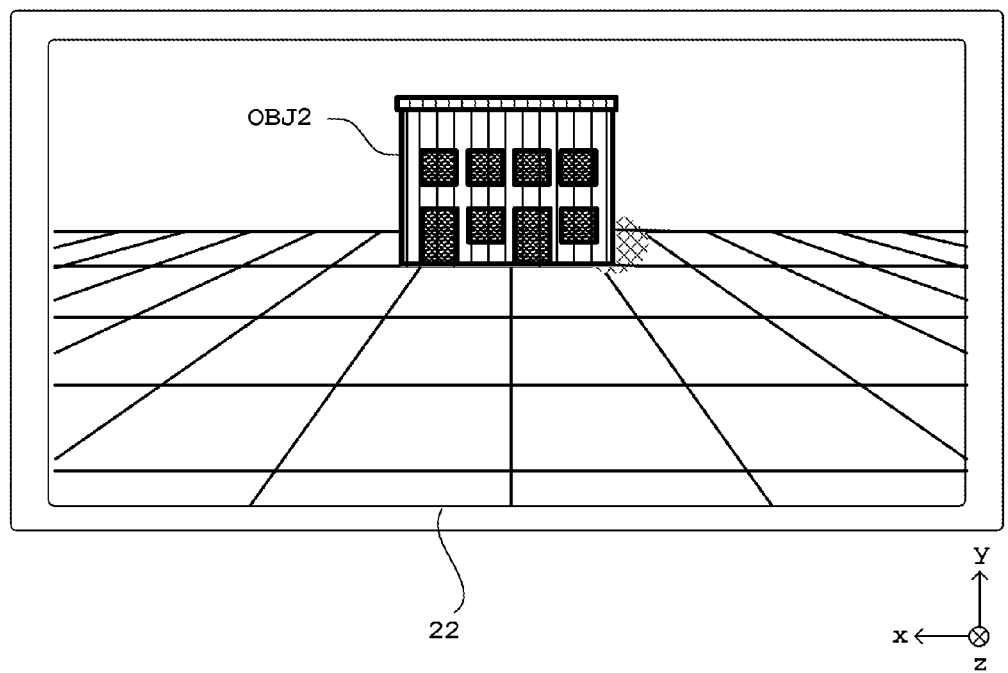
FIG. 4C is a schematic diagram showing an example of an image displayed on the upper LCD 22 that has been obtained by rendering a virtual object based on perspective projection.

An example of an image obtained by using such projection is shown in FIG. 4C. FIG. 4C is a schematic diagram showing an example of an image displayed on the upper LCD 22 that has been obtained by rendering a virtual object based on the perspective projection. Specifically, a 3-dimensional scene in which a virtual object OBJ2 representing a building is placed in a virtual space is shown in FIG. 4C.

Figure 4D:
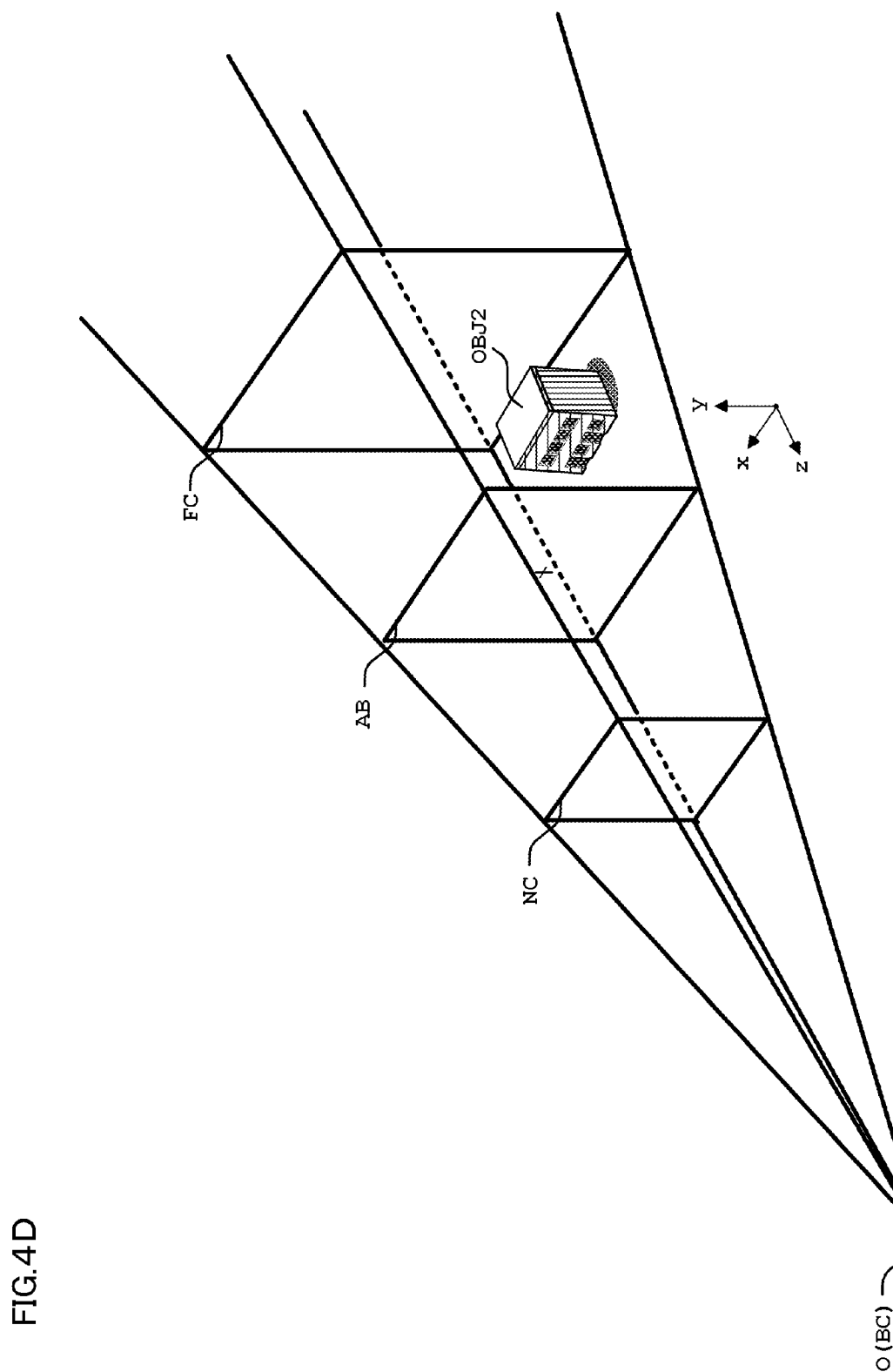
FIG. 4D is a schematic diagram showing an example of a view volume assumed for obtaining the image shown in FIG. 4C.

FIG. 4D is a schematic diagram showing an example of a view volume assumed for obtaining the image shown in FIG. 4C. The schematic diagram exemplifies a view volume defined by a predetermined angle of view, the viewpoint O (the position of a virtual camera BC), a far clip plane FC, a near clip plane NC, and a projection plane AB.

In order to generate an image for right eye and an image for left eye in a stereoscopically visible manner, a virtual stereo camera (a right virtual camera RC and a left virtual camera LC) for generating these images are to be used. FIG. 4D exemplifies a view volume of the virtual camera BC which is used as a reference for defining the setting of the virtual stereo camera. That is, in the view volume, the position of the virtual camera BC is set as the origin. Such a view volume is transformed to a unit cube, whereby an image is obtained in which an object positioned far from the viewpoint is displayed in a smaller manner than the same object positioned near the viewpoint.

In the exemplary embodiment, the midpoint between the positions of the right virtual camera RC and the left virtual camera LC corresponds to the position of the virtual camera BC. In addition, in the exemplary embodiment, a line connecting the positions of the right virtual camera RC and the left virtual camera LC is parallel to the projection plane AB.

The right virtual camera RC and the left virtual camera LC form their respective view volumes similar to the view volume of the virtual camera BC. These view volumes share the projection plane AB used in the view volume of the virtual camera BC. The details of the view volumes will be described later. At any rate, stereoscopically visible images having binocular disparity therebetween is generated by using the above two view volumes, i.e., by projecting the same object (subject) onto a projection plane by perspective projection based on a plurality of viewpoints (virtual cameras). The images based on the plurality of viewpoints are generated through the following procedure.

After the projection processing, the model placed in the virtual space is positioned at normalized apparatus coordinates. As used herein, the "normalized apparatus coordinates" refer to apparatus coordinates specified by an intermediate coordinate system and normalized within a predetermined range (typically, 0 to 1). A display image represented by the normalized apparatus coordinate system is displayed at the same relative position in any apparatus space. Here, the "apparatus coordinates" are specified by a coordinate system depending on the apparatus. A virtual space including an object defined in the normalized apparatus coordinate system makes it possible to display an image corresponding the virtual space at a predetermined position on the display surface of the display device without depending on the display device.

The virtual object defined in the normalized apparatus coordinate system is subjected to clipping processing as necessary, and then mapped in the apparatus coordinate system (screen coordinate system). Specifically, each object is subjected to translation operation and enlargement/contraction operation so as to match the standard and configuration of the display device (for example, the upper LCD 22), and is defined in the apparatus coordinate system as a 2-dimensional coordinate system defining the display surface (it is noted that, if information about depth direction is added, the value can be held in any storage area in the game apparatus 10). The apparatus coordinate system may be defined, as the display surface, by an xy plane whose origin is set at the center of the display area of the upper LCD 22 and that is parallel to the display surface, for example.

The game apparatus 10 displays, on the upper LCD 22, an image for right eye and an image for left eye that reflect the virtual camera interval. Owing to the parallax barrier, the image for right eye and the image for left eye are recognized by the right eye and the left eye of a user, respectively, and owing to binocular disparity, the images perceived by the respective eyes cause a stereoscopic effect. The description thus far is the summary of processing by the game apparatus 10 for rendering a virtual space in a stereoscopically visible manner.

(Novel Features for Providing Stereoscopically Visible Display of Virtual Object)

As described above, in the case where a 3-dimensional space is represented by using perspective projection, an object at a far position is displayed in a smaller manner than the same object at a near position. Then, when a stereoscopically visible image is generated based on the image thus rendered, a stereoscopic view is provided keeping the above effect that such an object at a far position becomes small. In the exemplary embodiment, even if virtual objects placed in a 3-dimensional space rendered in accordance with the perspective projection are displayed on the display surface in a stereoscopically visible manner, the game apparatus 10 can display a predetermined object on the same display surface in a stereoscopically visible manner while maintaining a predetermined size and a predetermined position on the display surface, without influencing the setting of the perspective projection.

Next, a technical feature enabling such an effect will be described in more detail.

FIG. 4A is a schematic diagram showing an example of a GUI virtual object provided as a 2-dimensional image. The virtual object OBJ1 shown in FIG. 4A is defined as image data for representing the shape that can be visually recognized, and the light and shade of the color thereof.

Specifically, data of the virtual object OBJ1 represents a graphic of a structure having a rectangular shape, which is shaded so as to represent a portion protruding forward. The virtual object OBJ1 is displayed at a predetermined position on the display surface (for example, the upper LCD 22) of the display device, and functions as an icon (in the exemplary embodiment, an image representing a button) for, by using visual information, controlling processing performed by the game apparatus 10. A user can operate the icon by using predetermined input section (for example, a cursor, displayed on the display surface, that can be operated via the touch panel 13) of the game apparatus 10.

Here, although an image functioning as a push-button is exemplified as a GUI image, the GUI image is not limited thereto. For example, the GUI image may be an image representing a display area for indicating predetermined information to a user or a movable slider for operating a predetermined parameter, or may be an image having another function.

In accordance with a request occurring during execution of the game program 71, the virtual object OBJ1 for GUI is displayed on the upper LCD 22. When the parallax barrier is disabled, the GUI image is displayed in a planar manner. FIG. 4B is a schematic diagram showing an exemplified position of the object OBJ1 displayed on the upper LCD 22 when the parallax barrier is disabled. Based on the setting included in the request from the application program, the virtual object OBJ1 is displayed on the upper LCD 22 in a stereoscopically visible manner, in accordance with the position of the slider 25a of the 3D adjustment switch 25.

In the case where an image corresponding to the virtual object OBJ1 is displayed on the upper LCD 22 in a stereoscopically visible manner, a stereoscopically visible image of the virtual object OBJ1 is displayed in accordance with the position of the slider 25a of the 3D adjustment switch 25. In order to provide the function of the virtual object OBJ1 as GUI, it is preferable that the position and the size of the virtual object OBJ1 displayed on the display surface (upper LCD 22) are fallen within a predetermined range. Here, the predetermined range is such that the image of the virtual object OBJ1 can be sufficiently visually recognized for providing a function as a GUI icon and can be operated as necessary.

The summary of a procedure for the game apparatus 10 to display the virtual object OBJ1 on the upper LCD 22 in a stereoscopically visible manner, is as follows.

Based on the setting of the application program (game program 71), the position information in the virtual space is specified for the virtual object OBJ1. Then, projection processing using parallel projection is performed in accordance with the position information. Specifically, for example, after the view coordinate transform, the game apparatus 10 projects the virtual object OBJ1 by orthogonal projection (parallel projection) onto a projection plane which is typically present at the position corresponding to the reference plane AB and can be practically regarded as a plane corresponding to the upper LCD 22. However, the projection plane is not limited thereto. The main feature of the orthogonal projection is that parallel lines are maintained in parallel after the transform. In general, this transform is called projection coordinate transform.

Next, in order to provide a stereoscopically visible image, the information processing section 31 of the game apparatus 10 translates the image of the virtual object OBJ1 projected onto the projection plane by parallel projection, in a predetermined direction and by a predetermined distance on the projection plane, from a base point which is the position of the image. The game apparatus 10 determines, for the virtual object OBJ1, the distance and the direction of the translation for providing a stereoscopically visible image, by using the setting of a virtual stereo camera for providing images in a stereoscopically visible manner.

Specifically, the direction and the distance are calculated by the following method. In order to explain the calculation method, a method for calculating the displacement of a projected image (corresponding point) of an object between an image for right eye and an image for left eye, which displacement is to be set for an object at any point, will be described with reference to FIG. 4E.

Figure 4E:
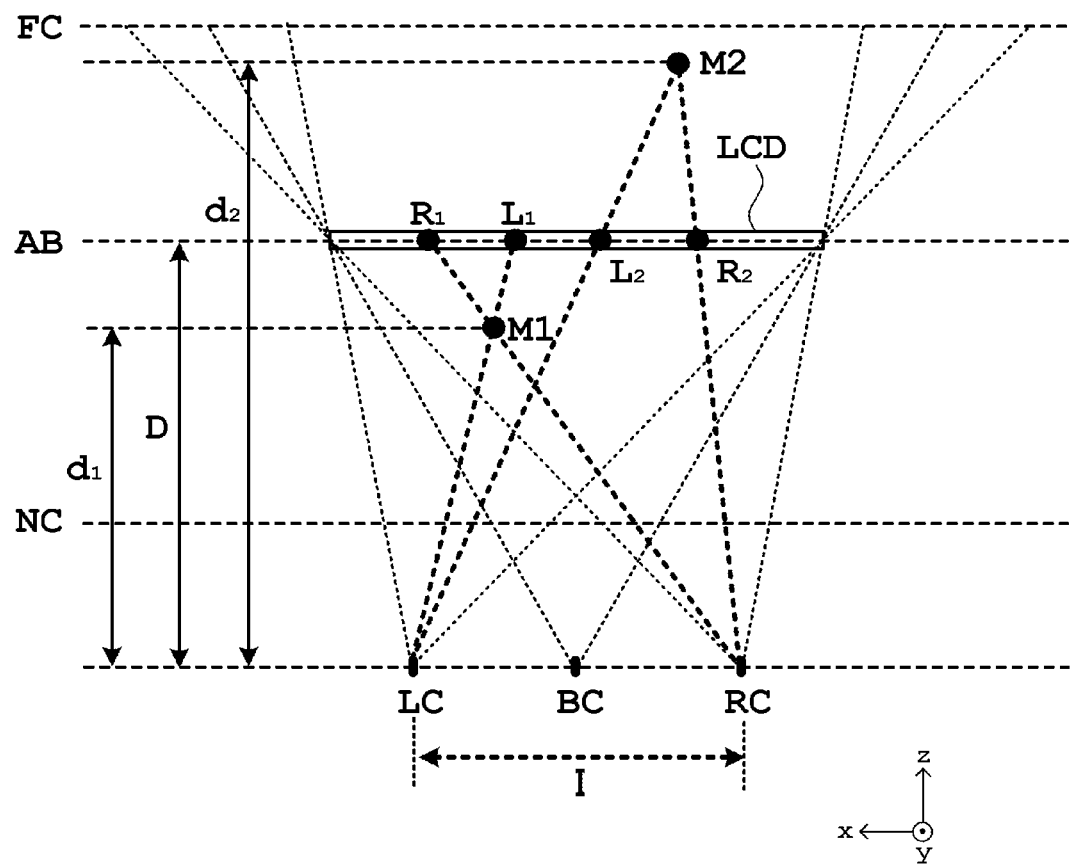
FIG. 4E is an exemplified schematic diagram showing view volumes of a right virtual camera RC and a left virtual camera LC, and a view volume of a virtual camera BC which is a reference for calculating the positions of those virtual cameras.

FIG. 4E is a schematic diagram showing view volumes of the right virtual camera RC and the left virtual camera LC, and a view volume of the virtual camera BC which is a reference for calculating the positions of those virtual cameras. Each view volume is sandwiched between the far clip plane FC and the near clip plane NC parallel to the far clip plane FC. The projection plane, which corresponds to the display surface of the upper LCD 22, is present at the position of the reference plane AB which is parallel to both clip planes.

First, regarding a representative point M1 of a virtual object positioned nearer each virtual camera than the reference plane, the displacement in the horizontal direction (x-axis direction) to be caused between the images projected on an image for right eye and an image for left eye so as to provide a stereoscopic view will be described.

The following model will be assumed in order to calculate the condition for displaying the representative point M1 on the display surface of the game apparatus 10 so as to provide a feeling (a kind of depth feeling) of the representative point M1 being present in front of the projection plane which is present at a position corresponds to the display surface of the game apparatus 10.

In order to display the image of the representative point M1 separated from the virtual camera by a distance $d_1$ so as to appear in front of the projection plane, the image of the representative point M1 is rendered, on each of an image for right eye and an image for left eye, at a position corresponding to the intersection of the reference plane with a line connecting each virtual camera (right virtual camera and left virtual camera) and the representative point M1 (here, the intersection for right virtual camera is $R_1$, and the intersection for left virtual camera is $L_1$). That is, the images projected on the image for right eye and the image for left eye are rendered at a position displaced leftward on the image for right eye and a position displaced rightward on the image for left eye, respectively, from a base point which is the position of the image projected based on the virtual camera BC. Then, it is understood that the displacement in the horizontal direction caused between the images projected on the image for right eye and the image for left eye is to be a length $R_1L_1$.

The length $R_1L_1$ is represented as follows, using a virtual camera interval I and a distance D to the virtual camera.

$$R_1L_1 = I^*(D-d_1)/d_1 \qquad \text{Expression (1)}$$

Where $D \geq d_1$.

Similarly, regarding a representative point M2 of a virtual object positioned in back of the reference plane (upper LCD 22) (i.e., positioned farther from the viewpoint than the reference plane) and separated from the reference plane by a distance $d_2$, a length $R_2L_2$ which is the displacement of the representative point M2 is expressed by the following expression.

$$R_2L_2 = I^*(d_2-D)/d_2 \qquad \text{Expression (2)}$$

Where $D < d_2$.

Hereinafter, the displacements obtained in accordance with the calculation of the lengths $R_1L_1$ and the $R_2L_2$ are collectively referred to as $\Delta X'$. In this case, the images projected on the image for right eye and the image for left eye are rendered at a position displaced rightward on the image for right eye and a position displaced leftward on the image for left eye, respectively, from the base point which is the position of the image projected based on the virtual camera BC.

Therefore, in order to obtain a stereoscopically visible image, an image for right eye and an image for left eye are generated such that the displacement in the above direction, of an image obtained by parallel projection onto a projection plane, between those images is $\Delta X'$.

The game apparatus 10 of the present embodiment generates a stereoscopically visible image of the virtual object OBJ1 for GUI, by using a calculation method similar to the above calculation method of $\Delta X'$. Hereinafter, this respect will be described with reference to FIG. 4F.

Figure 4F:
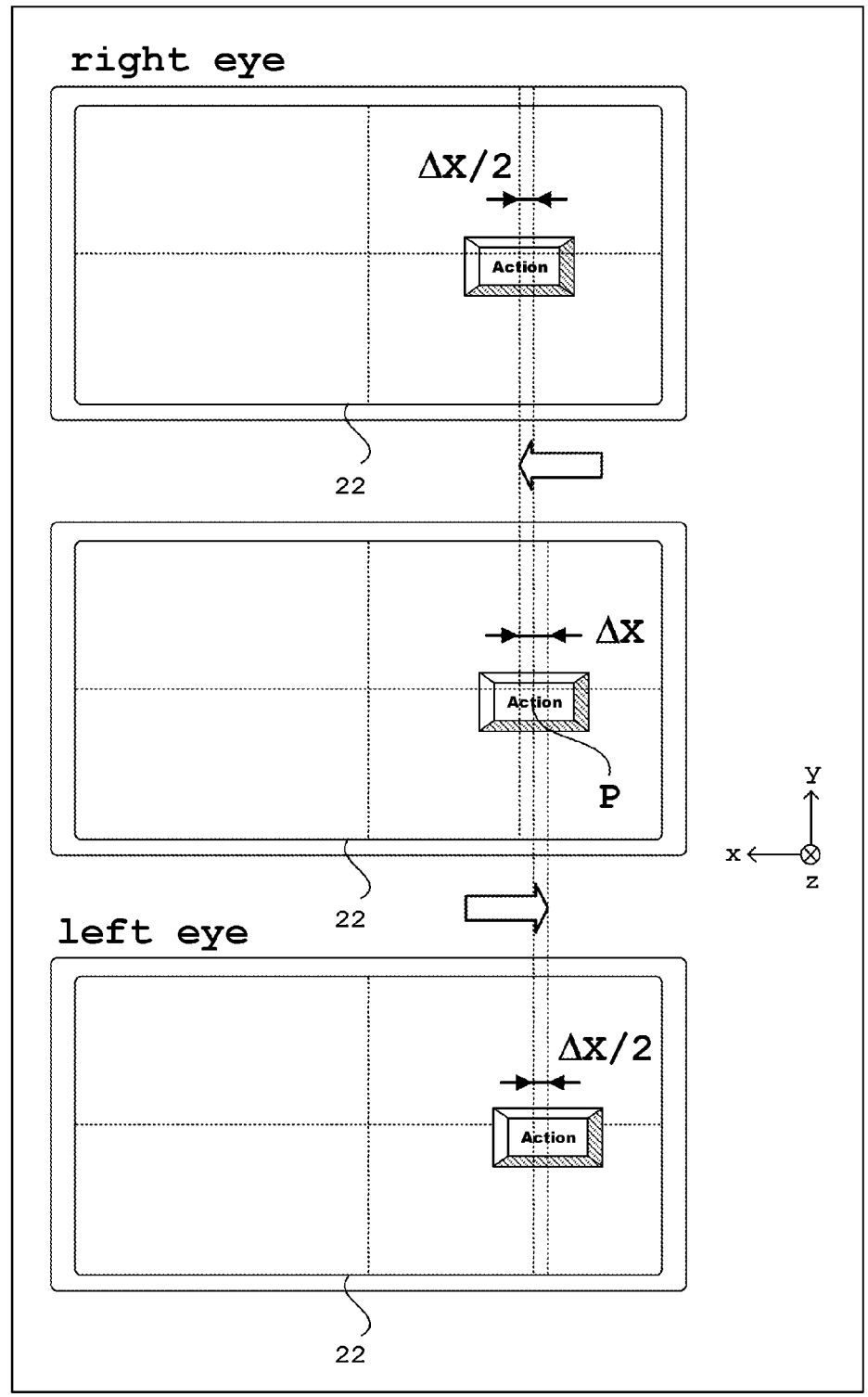
FIG. 4F is a schematic diagram for explaining an example of processing of translating, on a projection plane, an object of the virtual object OBJ1 obtained by parallel projection onto the projection plane.

FIG. 4F is a schematic diagram for explaining a displacement $\Delta X$ for displaying the virtual object OBJ1 in a stereoscopically visible manner so as to appear to protrude forward from the display surface.

The virtual object OBJ1 has the position information as an initial value defined by the application program or a value dynamically determined by the application program. Typically, the position information may be defined as depth information (for example, Z value), and position information in the world coordinate system or coordinate information on the display surface (upper LCD 22) of the display device of the game apparatus 10, which corresponds to coordinates in the world coordinate system.

In the exemplary embodiment, the virtual object OBJ1 is displayed as a GUI icon on the display surface (for example, the upper LCD 22). Here, the virtual object OBJ1 has a depth value corresponding to the position of the representative point M1 or M2. If the virtual object OBJ1 is displayed in a stereoscopically visible manner so as to protrude forward from the display surface, the virtual object OBJ1 has the depth value corresponding to the representative point M1.

Specifically, the virtual object OBJ1 is provided as a 2-dimensional image as described above, and the depth values corresponding to the representative points M1 and M2 are stored in the main memory so as to be associated with the 2-dimensional image, for example. When the virtual object OBJ1 has the depth values (for example, in the case of assuming the same system as that shown in FIG. 4E, d1 and d2), the displacement $\Delta X$ corresponding to the depth value is calculated based on the virtual camera interval I, the distance D, and the obtained depth value (d1 or d2), similarly to the calculation of $\Delta X'$. That is, the information processing section 31 calculates the displacement $\Delta X$, from the setting of the virtual camera and the depth information. Then, the image of the virtual object OBJ1 is translated on the projection plane of the virtual object OBJ1, which corresponds to the display surface (upper LCD 22), based on the displacement $\Delta X$.

In the present embodiment, an image obtained by parallel projection onto a projection plane is translated by $\Delta X/2$ on each of an image for right eye and an image for left eye. In the case of providing a stereoscopic effect of protruding forward from the reference frame, the direction of the translation is such that the images projected on the image for right eye and the image for left eye are rendered at a position displaced leftward (with respect to the image) on the image for right eye and a position displaced rightward on the image for left eye, respectively, from the base point which is the position of the image of the virtual object OBJ1 projected onto the projection plane by parallel projection.

Specifically, the above processing will be described with reference to an example shown in FIG. 4F. A schematic diagram in FIG. 4F includes three stages each of which represents the upper LCD 22.

At the middle in the drawing, a position P of the image of the virtual object OBJ1 projected by parallel projection onto the projection plane corresponding to the upper LCD 22, is schematically shown. The image is translated from the position P as a reference, on each of an image for right eye and an image for left eye. At the top in the drawing, the position of the virtual object OBJ1 on the image for right eye displayed on the upper LCD 22 in order to provide a stereoscopic view, is shown. The virtual object OBJ1 is displayed at a position translated, leftward on the drawing, by $\Delta X/2$ from the position shown at the middle in the drawing. At the bottom in the drawing, the position of the virtual object OBJ1 on the image for left eye displayed on the upper LCD 22 in order to provide a stereoscopic view, is shown. The virtual object OBJ1 is displayed at a position translated, rightward on the drawing, by $\Delta X/2$ from the position shown at the middle in the drawing. Thus, the displacement of $\Delta X$ (see the middle in the drawing) is caused in total between the image for right eye and the image for left eye. Owing to the above configuration, a stereoscopic effect of protruding forward from the reference plane is provided to the virtual object OBJ1.

On the other hand, in the case of providing a stereoscopic effect of a virtual object appearing in back of the reference plane, the images projected on the image for right eye and the image for left eye are rendered at a position displaced rightward (with respect to the image projected by the parallel projection) on the image for right eye, and at a position displaced leftward on the image for left eye, respectively, from the base point which is the position of the image of the virtual object OBJ1 projected onto the projection plane by parallel projection.

Figure 4G:
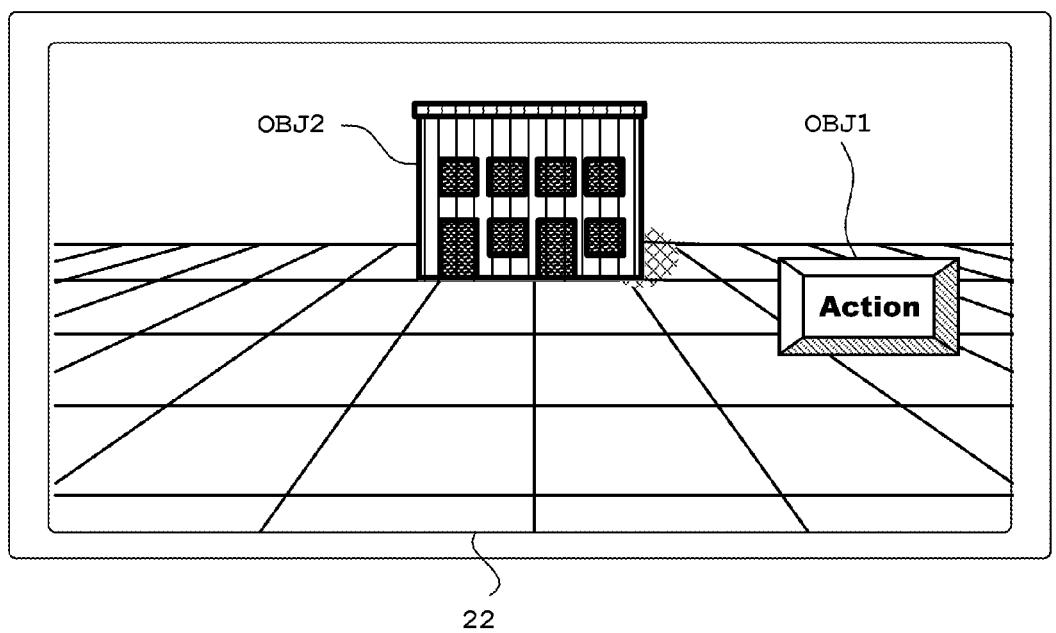
FIG. 4G is a schematic diagram showing an example of the display surface (upper LCD 22) on which the virtual object OBJ1 projected by parallel projection is displayed being superimposed on a virtual object OBJ2 displayed based on perspective projection.

FIG. 4G is a schematic diagram showing the display surface (upper LCD 22) on which the virtual object OBJ1 projected by parallel projection is displayed being superimposed on the virtual object OBJ2 displayed based on perspective projection. As shown in FIG. 4C, even if the virtual object OBJ2 rendered by using perspective projection is provided in a stereoscopically visible manner through transform based on the perspective projection, the size on the display surface and the relative position of the virtual object OBJ1 can be kept within a predetermined range, while the virtual object OBJ1 is displayed on the display surface in a stereoscopically visible manner.

(Memory Map)

Figure 5:
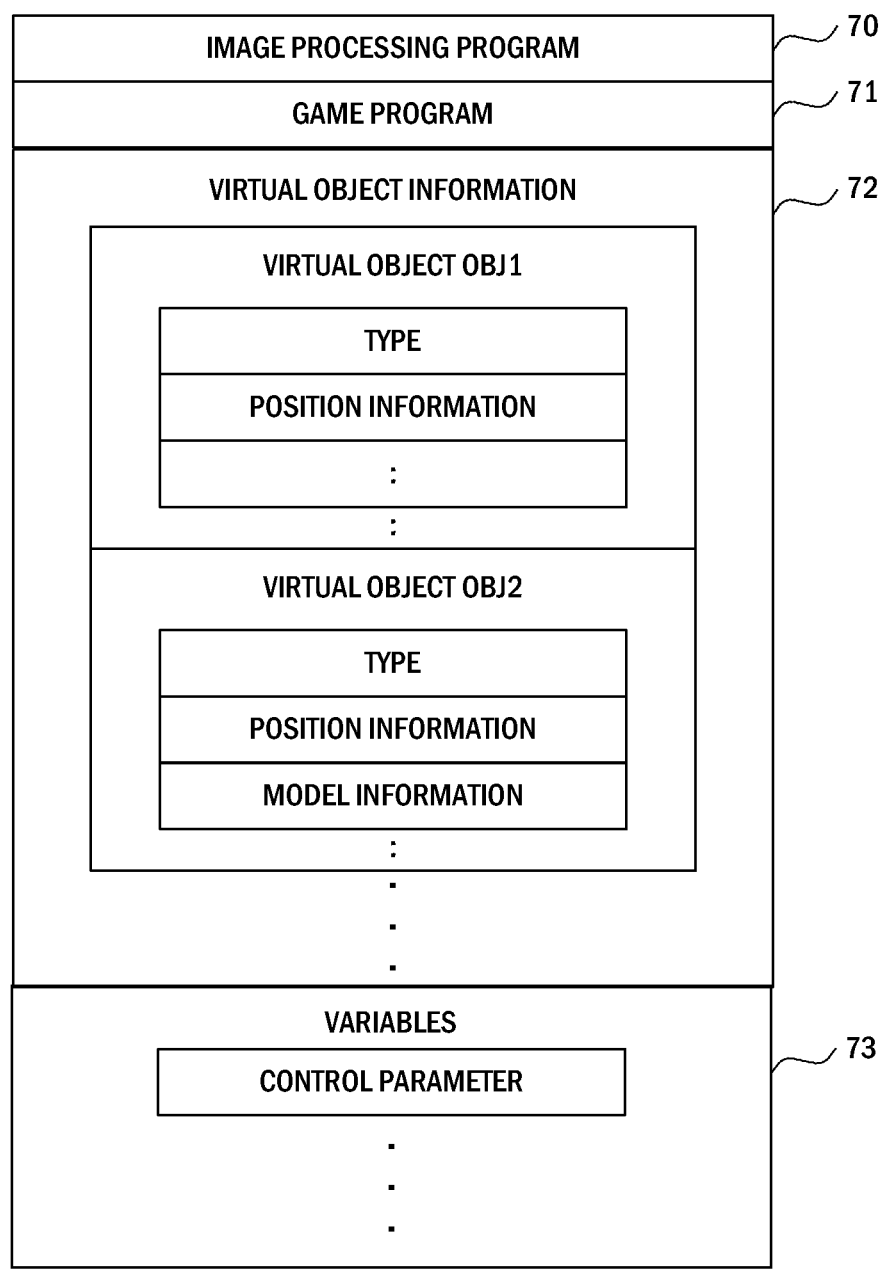
FIG. 5 is a schematic diagram showing an example of the memory map of a main memory 32 of the game apparatus 10.

Hereinafter, main data to be stored in the main memory 32 during execution of a game program will be described. FIG. 5 is a schematic diagram showing the memory map of the main memory 32 of the game apparatus 10. As shown in FIG. 5, the game program 71, the image processing program 70, a virtual object information 72, variables 73, and the like are stored in the main memory 32.

The image processing program 70 is a program for realizing the processing of the exemplary embodiment by being called in the game processing based on the game program 71 or by functioning as a part of the game program 71.

The game program 71 is a program for causing the information processing section 31 to execute game display processing.

The virtual object information 72 is information about virtual objects, which includes: the types of virtual objects (e.g., a 2-dimensional image for user interface and a 3-dimensional object represented by a 3-dimensional model); model information (for example, information about polygon) representing, when the type is a 3-dimensional virtual object, the shape or the pattern thereof; position information about each virtual object in a virtual space; and the like.

It is noted that the position information may be defined in any coordinate system. That is, position coordinates representing the position information may be defined in any coordinate system such as a world coordinate system, a camera coordinate system, a normalized apparatus coordinate system, or an apparatus coordinate system, in accordance with the intended purpose of a virtual object. Any coordinate system may be used as long as the image processing program 70 and/or the game program 71 can transform inputs based on any coordinate systems to the one for each other's coordinate system as necessary, and appropriate data in an appropriate form can be provided during processing. In addition, if a virtual object is represented as 2-dimensional image data, the 2-dimensional image data includes not only the shape of a visually represented graphic, but also information about the color and the like. Further, the 2-dimensional image data can include depth information (for example, Z value) as necessary.

The variables 73 are used in execution of the game program 71 and the image processing program 70.

(Specific Example of Processing of Exemplary Embodiment)

Figure 6A:
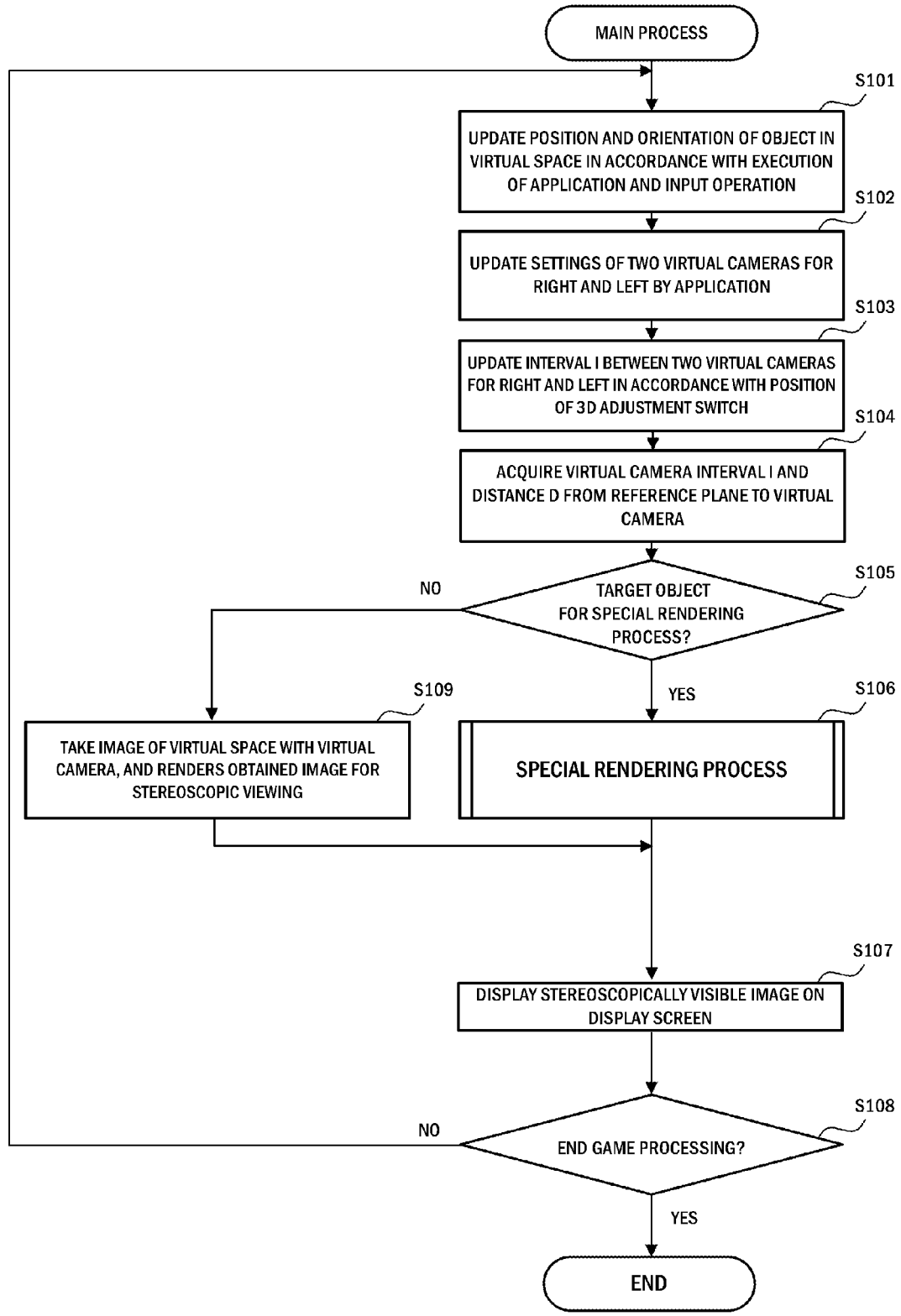
FIG. 6A is a flowchart showing an example of a main process executed based on an image processing program 70 by the game apparatus 10 of the exemplary embodiment.

Hereinafter, with reference to the flowcharts in FIG. 6A and the subsequent drawings, the flow of processing executed based on the image processing program of the exemplary embodiment will be described. In FIG. 6A and the subsequent drawings, "step" is abbreviated as "S". It is noted that the flowcharts in FIG. 6A and the subsequent drawings are merely examples of processes. Therefore, the order of steps may be changed as long as the same result is obtained. Also, the values of the variables, and threshold values used in determination steps are merely examples, and other values may be used as necessary.

FIG. 6A is a flowchart showing an example of a main process executed based on the image processing program 70 by the game apparatus 10 of the exemplary embodiment.

In step 101, the information processing section 31 updates the position and the orientation of an object in the virtual space in accordance with the execution of the application program and an input operation. Specifically, for example, the position and the orientation, in the world coordinate system, of the virtual object in the virtual space are changed in accordance with predetermined processing defined by the game program 71.

In step 102, the information processing section 31 sets the virtual camera interval I, and the positions and directions of the virtual cameras, in accordance with a definition by the application program. Specifically, the information processing section 31 determines and updates the positions, the directions, and the like of the left virtual camera LC and the right virtual camera RC. In the determination, the information processing section 31 may set the position of the virtual camera BC first, and then may set the positions of the left virtual camera LC and the right virtual camera RC, based on the positional relationship relative to the position of the virtual camera BC, for example. Alternatively, the information processing section 31 may set the position of one of the left virtual camera LC and the right virtual camera RC first, and then may set the position of the other one, based on the positional relationship relative to the position set first, for example. The information processing section 31 stores the distance between the right virtual camera and the left virtual camera as the virtual camera interval I in a storage area (for example, the variables 73 of the memory map in FIG. 5) of the game apparatus 10.

In step 103, the information processing section 31 updates the virtual camera interval I in accordance with the position of the slider 25a of the 3D adjustment switch 25. By the update of the virtual camera interval I, the degree of stereoscopic effect recognized in stereoscopic viewing changes. That is, the protruding degree of an object appearing to protrude forward from the reference plane changes, or the distance to the depth position of an object appearing to be in back of the reference plane changes. The smaller the virtual camera interval is, the smaller the degree of stereoscopic effect is, while the larger the virtual camera interval is, the larger the degree of stereoscopic effect is.

In step 104, the information processing section 31 acquires the updated virtual camera interval I, and the distance D from the reference plane to the virtual camera. In the example shown in FIG. 4E, the distance between the reference plane AB corresponding to the position of the upper LCD 22, and the virtual camera BC (alternatively, the virtual camera LC or the virtual camera RC) may be calculated as the distance D.

In step 105, the information processing section 31 determines whether or not an object (target object) for which a special rendering process is to be performed is present. Specifically, for example, the virtual object OBJ1 for GUI (see FIG. 4A and FIG. 4B) can be a target object. If, in the setting of the application program, the virtual object OBJ1 is to be displayed on the display surface (upper LCD 22) (YES in step 105), the information processing section 31 determines that the target object is present, and proceeds to step 106. On the other hand, if such a target object to be displayed on the display surface is not present (NO in step 105), the information processing section 31 proceeds to step 109. It is noted that the number of target objects is not limited to one. An object group including a plurality of objects may be used as target objects.

Figure 6B:
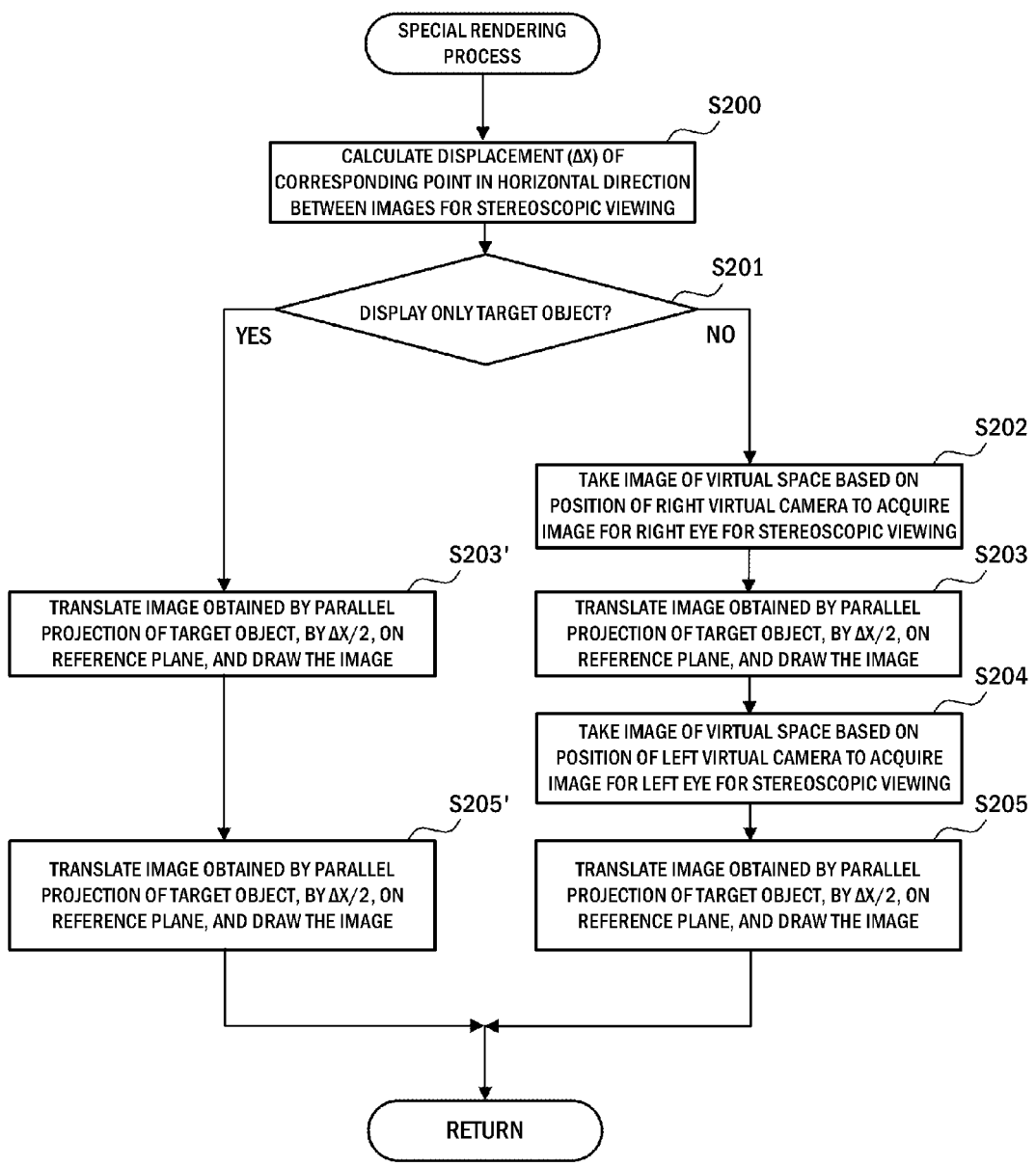
FIG. 6B is a flowchart showing an example of a special rendering process.

In step 106, the information processing section 31 executes the special rendering process. Specifically, the information processing section 31 executes a series of steps exemplified in FIG. 6B. Hereinafter, with reference to FIG. 6B, the special rendering process will be more specifically described. FIG. 6B shows an example of a flowchart of the special rendering process.

In step 200, the information processing section 31 calculates the displacement ($\Delta X$) in the horizontal direction between the corresponding points on images for stereoscopic viewing. Specifically, the information processing section 31 calculates the displacement ($\Delta X$) in the horizontal direction between the corresponding points, based on the updated virtual camera interval I and the distance D from the reference plane to the virtual camera, which have been acquired in step 104. As described with reference to FIGS. 4E and 4F, the displacement is a value defined for displaying a target object on the display surface in a stereoscopically visible manner. If, of the units of the information processing section 31, the GPU 312 performs the calculation of the displacement, the effect of reducing the load on the CPU 311 can be obtained.

In step 201, the information processing section 31 determines whether or not a virtual object or the like that is to be displayed on the upper LCD 22 at the same time as the target object is present.

Specifically, the information processing section 31 determines whether or not a partial space, of the virtual space, in which a virtual object can be placed is defined to be rendered at the same time as the target object, by referring to a predetermined parameter obtained by the setting and the execution of the application program. If the information processing section 31 determines that such a partial space is present (NO in step 201), the information processing section 31 proceeds to step 202. Otherwise (YES in step 201), the information processing section 31 proceeds to step 203'.

In step 202, the information processing section 31 takes an image of the virtual space, based on the position of the right virtual camera RC, to acquire an image for right eye for stereoscopic viewing. Specifically, the information processing section 31 acquires an image for right eye by performing perspective projection for the virtual space including a predetermined object (for example, the virtual object OBJ2) based on the position of the right virtual camera RC as a viewpoint.

In step 203, the information processing section 31 translates the image of the target object obtained by parallel projection, by $\Delta X/2$, on the reference plane, and draws the image on the projection plane.

In step 204, the information processing section 31 projects the virtual space, based on the position of the left virtual camera LC, to acquire an image for left eye for stereoscopic viewing. Specifically, the information processing section 31 acquires an image for left eye by performing perspective projection for the virtual space including a predetermined object (in the above example, the virtual object OBJ2) based on the position of the left virtual camera LC as a viewpoint.

In step 205, the information processing section 31 translates the image of the target object obtained by parallel projection, by $\Delta X/2$, on the reference plane, and draws the image on the projection plane. Subsequent to this step, the information processing section 31 performs processing of step 107 (FIG. 6A).

On the other hand, if, step 201, the information processing section 31 determines that a virtual object or the like that is to be displayed on the upper LCD 22 at the same time as the target object is not present, the information processing section 31 proceeds to step 203', and then subsequent step 205'. The step 203' and step 205' are similar to step 203 and step 205, respectively. In step 203 and step 205, when acquiring the image for right eye and the image for left eye, the information processing section 31 has dealt with a rendering subject other than the target object, as a subject to be included in the images. Step 203' and step 205' are different from step 203 and step 205 in that such a rendering subject is not dealt with. Therefore, in step 203' and step 205', the information processing section 31 generates images for stereoscopic viewing that includes only the target object.

In step 107, the information processing section 31 displays the images for stereoscopic viewing on the display surface. Specifically, the information processing section 31 divides each of the image for right eye and the image for left eye generated as described above into aligned rectangle-shaped images each composed of one line of pixels in the vertical direction, and displays, on the screen of the upper LCD 22, an image composed of the divided rectangle-shaped images for right eye and the divided rectangle-shaped images for left eye that are alternately arranged.

In step 108, the information processing section 31 determines whether or not to end the game processing. Specifically, for example, when an input operation for ending the game processing has been performed for the game apparatus 10 by a player, or when a predetermined condition has been satisfied in the game (for example, a stage has been cleared) (Yes in step 108), the information processing section 31 ends the game processing. On the other hand, when an input operation for not ending the game processing has been performed for the game apparatus 10 by a player, or when a predetermined condition has not been satisfied in the game (No in step 108), the information processing section 31 returns to step 101 and repeats the process of steps 101 to 107.

It is noted that, in step 109, the information processing section 31 performs processing corresponding to step 202 and step 204 without any target object, thereby generating images for stereoscopic viewing that represent the virtual space.

(Examples of Effects Provided by Exemplary Embodiment)

The game apparatus 10 according to the exemplary embodiment provides an image of a desired partial space of a virtual space, on the display surface, in a stereoscopically visible manner, in accordance with the progress of the application program. While displaying the image corresponding to the partial space on the display surface in a stereoscopically visible manner, the game apparatus 10 can also display a desired GUI image in a stereoscopically visible manner so as to satisfy various requirements as GUI.

In the embodiment having the above-described feature, when the manufacturer of the application program desires to display a GUI object at a designated position on the display surface, the manufacturer can place the GUI object at an intended position without taking into consideration the manner in which the GUI object is stereoscopically viewed and the position at which the GUI object is displayed on the display surface.

In the above-described embodiment, the information processing section 31 translates the image of a virtual object in a first direction by the half of the displacement ΔX, from a base point which is the position of the image projected onto the projection plane by parallel projection, thereby generating an image for right eye. Then, the information processing section 31 translates the image of the virtual object in the direction opposite to the first direction by the half of the displacement ΔX, from the base point, thereby generating an image for left eye. Owing to such a configuration, a user can obtain a stereoscopic view without a feeling of strangeness.

In the above-described embodiment, by operating the 3D adjustment switch as hardware, a user can obtain a preferred stereoscopic effect without being aware of the operation of an application. It is possible to adjust the degree of stereoscopic effect for a GUI image without changing the setting of the virtual stereo camera.

In the above-described embodiment, if, of the units of the information processing section 31, the GPU 312 performs the calculation of the displacement ΔX and the like, the load on the CPU 311 can be reduced.

In the above-described embodiment, if the depth information of a 2-dimensional image is given, the 2-dimensional image can be easily displayed in a stereoscopically visible manner based on the setting of the virtual stereo camera.

In the case of using a program represented as a code aggregate for providing a function of the above image processing program, the manufacturer of the application program can easily provide the application program with a function of generating a stereoscopically visible image including a desired object, merely by giving a combination of the position on the display surface and the depth information, without separately taking into consideration the manner in which the object is stereoscopically viewed and the position at which the object is displayed on the display surface.

(Modifications and Other Matters)

In the above-described exemplary embodiment, parallel projection is performed for a GUI image, as an example. However, instead of a GUI image, the exemplary embodiments are applicable to any image or object. In the case where such an image is to be displayed on the display surface in a stereoscopically visible manner while the size or the position of the image on the display surface is freely determined, it is possible to provide a novel image processing apparatus or the like with increased convenience, by using the exemplary embodiments.

In the exemplary embodiment describe above, the display device (upper LCD 22) that provides stereoscopic viewing with naked eyes is used, and the parallax barrier method is used as a method for providing stereoscopic viewing with naked eyes. However, in another embodiment, another method (e.g., a lenticular lens method) may be used. Alternatively, the image processing program and the like may be applied to display of a display device using another method. For example, a method in which special eyeglasses are used (e.g., an anaglyph method, a polarization method, a time-sharing shutter method) may be used to provide stereoscopic viewing by using binocular disparity. For example, in the anaglyph method, an image for left eye is rendered in blue, and an image for right eye is rendered in red. Then, an observer can obtain a sense of perspective based on binocular disparity, by observing these images with a anaglyph scope (eyeglasses having a red filter for a left eye and a blue filter for a right eye).

In the exemplary embodiment described above, the image processing program 70 is used with the game apparatus 10. However, in another embodiment, the image processing program may be used with any information processing apparatus or any information processing system (e.g., a PDA (Personal Digital Assistant), a mobile phone, a personal computer, or a camera).

In addition, in the exemplary embodiment described above, the image processing program is executed in game processing by using only one apparatus (game apparatus 10). However, in another embodiment, a plurality of information processing apparatuses, included in an image display system, that can communicate with each other may share the execution of the image processing program.

Note that in the case where the exemplary image processing program and the like disclosed herein are used on a general-purpose platform, the image processing program may be provided under the condition that a standard program module provided on the platform is used. It should be understood that even if a function corresponding to such a module as described above is excluded from the image processing program, the resultant image processing program substantially corresponds to the original image processing program as long as the module complements the excluded function.

While the exemplary embodiments of the present technology has been described in detail, the foregoing description is in all aspects illustrative and not restrictive. It is understood that numerous other modifications and variations can be devised without departing from the scope of the present technology. It should be understood that the scope of the present technology is interpreted only by the scope of the claims. It is also understood that, from the description of specific exemplary embodiments disclosed herein, a person skilled in the art can easily implement the exemplary embodiments in the equivalent range based on the description of the exemplary embodiments and on the common technological knowledge. Further, it should be understood that terms used in the present specification have meanings generally used in the art concerned unless otherwise specified. Therefore, unless otherwise defined, all the jargon and technical terms have the same meanings as those generally understood by a person skilled in the art. In the event of any conflict, the present specification (including meanings defined herein) has priority.

What is claimed is:

1. A non-transitory computer-readable storage medium having stored therein an image processing program which is executed by a computer of an image processing apparatus capable of outputting an image in a stereoscopically visible manner, the image processing program causing the computer to perform at least:

virtual stereo camera setting acquiring for acquiring setting information about a virtual stereo camera configured for imaging of a virtual space to provide a first image for right eye and a first image for left eye in a stereoscopically visible manner;

position designating for designating the position of a first object in the virtual space, including a depth-directional position thereof, which defines the imaging direction of the virtual stereo camera;

calculation for calculating a displacement for allowing an image of the first object obtained by parallel projection to be stereoscopically viewed, by using the setting information about the virtual stereo camera, and the depth-directional position of the first object; and image generation for translating from a predetermined position for each of the first image for right eye and the first image for left eye, the first object that is associated with the designated position, along a plane perpendicular to the depth direction, to generate a second image for right eye and a second image for left eye each of which includes an image of the first object translated on the basis on the displacement and an image of a second object obtained by perspective projection.

2. The non-transitory computer-readable storage medium according to claim 1, wherein
the image generation acquires the image of the first object by parallel projection, and translates the acquired image, from a base point which is a position of the image on a projection plane of the parallel projection, along the projection plane.

3. The non-transitory computer-readable storage medium according to claim 1, wherein
the first image for right eye and the first image for left eye are obtained by performing perspective projection of the virtual space based on the position of a right virtual camera and the position of a left virtual camera composing the virtual stereo camera, respectively.

4. The non-transitory computer-readable storage medium according to claim 1, wherein
the image generation
projects the first object on a projection plane by parallel projection based on a reference virtual camera functioning as a reference for the right virtual camera and the left virtual camera composing the virtual stereo camera,
translates the projected image of the first object in a first direction, from a base point which is a position of the projected image on the projection plane, by a distance corresponding to the positional relationship between the right virtual camera and the reference virtual camera, the distance being a part of the displacement, thereby generating the second image for right eye, and
translates the projected image of the first object in a second direction, from the base point, by a distance corresponding to the positional relationship between the left virtual camera and the reference virtual camera, the distance being a part of the displacement, thereby generating the second image for left eye.

5. The non-transitory computer-readable storage medium according to claim 4, wherein
the image generation
projects the first object on a projection plane by parallel projection based on the reference virtual camera positioned at the middle point of the virtual stereo camera,
translates the projected image of the first object in the first direction, from the base point, by the half of the displacement, thereby generating the second image for right eye, and
translates the projected image of the first object in the direction opposite to the first direction, from the base point, by the half of the displacement, thereby generating the second image for left eye.

6. The non-transitory computer-readable storage medium according to claim 1, wherein
the setting information about the virtual stereo camera includes the distance between the right virtual camera and the left virtual camera composing the virtual stereo camera, and the distance between the virtual stereo camera and a reference plane, perpendicular to the depth direction, for providing a stereoscopic view, and
the calculation calculates the displacement by using the distance between the right virtual camera and the left virtual camera.

7. The non-transitory computer-readable storage medium according to claim 6, wherein
the image processing program further causes the computer to perform virtual camera interval changing for changing the distance between the right virtual camera and the left virtual camera, and
the virtual camera setting acquiring acquires the setting information about the virtual stereo camera that includes the distance changed by the virtual camera interval changing.

8. The non-transitory computer-readable storage medium according to claim 7, wherein
the virtual camera interval changing changes the distance by acquiring an input signal corresponding to an operation of the image processing apparatus performed by a user.

9. The non-transitory computer-readable storage medium according to claim 8, wherein
the operation by a user is performed via an input device having a slidable member, and
the movement amount of the slidable member is associated with the distance between the right virtual camera and the left virtual camera.

10. The non-transitory computer-readable storage medium according to claim 1, wherein
the calculation is performed by a graphics processing unit included in the computer.

11. The non-transitory computer-readable storage medium according to claim 1, wherein
the first object is defined as a 2-dimensional image that is parallel to a reference plane.

12. The non-transitory computer-readable storage medium according to claim 1, wherein
the image generation superimposes an image obtained by translating the image of the first object, on each of the first image for right eye and the first image for left eye, thereby generating the second image for right eye and the second image for left eye.

13. The non-transitory computer-readable storage medium according to claim 1, wherein
the image processing program is stored as a code aggregate for providing the function of the image processing program.

14. An image processing apparatus capable of outputting an image in a stereoscopically visible manner, the image processing apparatus comprising one or more computer processors configured to perform at least:

virtual stereo camera setting acquiring for acquiring setting information about a virtual stereo camera configured for imaging of a virtual space to provide a first image for right eye and a first image for left eye in a stereoscopically visible manner;

position designating for designating the position of a first object in the virtual space, including a depth-directional position thereof, which defines the imaging direction of the virtual stereo camera;

calculation for calculating a displacement for allowing an image of the first object obtained by parallel projection to be stereoscopically viewed, by using the setting information about the virtual stereo camera, and the depth-directional position of the first object; and image generation for translating from a predetermined position for each of the first image for right eye and the first image for left eye, the first object that is associated with the designated position, along a plane perpendicular to the depth direction, to generate a second image for right eye and a second image for left eye each of which includes an image of the first object translated on the basis on the displacement and an image of a second object obtained by perspective projection.

15. An image processing method for outputting an image in a stereoscopically visible manner, the image processing method comprising:

virtual stereo camera setting acquiring for acquiring setting information about a virtual stereo camera configured for imaging of a virtual space to provide a first image for right eye and a first image for left eye in a stereoscopically visible manner;

position designating for designating the position of a first object in the virtual space, including a depth-directional position thereof, which defines the imaging direction of the virtual stereo camera;

calculation for calculating a displacement for allowing an image of the first object obtained by parallel projection to be stereoscopically viewed, by using the setting information about the virtual stereo camera, and the depth-directional position of the first object; and image generation for translating from a predetermined position for each of the first image for right eye and the first image for left eye, the first object that is associated with the designated position, along a plane perpendicular to the depth direction, to generate a second image for right eye and a second image for left eye each of which includes an image of the first object translated on the basis on the displacement and an image of a second object obtained by perspective projection.

16. An image processing system capable of outputting an image in a stereoscopically visible manner, the image processing system comprising one or more computer processors configured to perform at least:

virtual stereo camera setting acquiring for acquiring setting information about a virtual stereo camera configured for imaging of a virtual space to provide a first image for right eye and a first image for left eye in a stereoscopically visible manner;

position designating for designating the position of a first object in the virtual space, including a depth-directional position thereof, which defines the imaging direction of the virtual stereo camera;

calculation for calculating a displacement for allowing an image of the first object obtained by parallel projection to be stereoscopically viewed, by using the setting information about the virtual stereo camera, and the depth-directional position of the first object; and image generation for translating from a predetermined position for each of the first image for right eye and the first image for left eye, the first object that is associated with the designated position, along a plane perpendicular to the depth direction, to generate a second image for right eye and a second image for left eye each of which includes an image of the first object translated on the basis on the displacement and an image of a second object obtained by perspective projection.

* * * * *